United States Patent [19]

Thyssen et al.

[11] 4,424,187
[45] Jan. 3, 1984

[54] APPARATUS FOR THE MONITORING OF THE PASSSAGE OF CONDUCTIVE OBJECTS THROUGH A TUBE

[75] Inventors: Heinz Thyssen, Jülich; Günter Breuer, Düren, both of Fed. Rep. of Germany

[73] Assignee: Kernforschungsanlage Jülich GmbH, Jülich, Fed. Rep. of Germany

[21] Appl. No.: 204,531

[22] Filed: Nov. 6, 1980

Related U.S. Application Data

[63] Continuation of Ser. No. 894,032, Apr. 6, 1978, abandoned.

[30] Foreign Application Priority Data

Apr. 12, 1977 [DE] Fed. Rep. of Germany ....... 2716109

[51] Int. Cl.³ .............................................. G21C 17/00
[52] U.S. Cl. ..................................... 376/245; 376/381; 377/10
[58] Field of Search ................... 340/674; 331/64, 65; 324/62, 64; 235/92 PC; 376/245, 381

[56] References Cited

U.S. PATENT DOCUMENTS

| | | | |
|---|---|---|---|
| 2,812,491 | 11/1957 | Figlio et al. | 324/54 |
| 2,819,447 | 1/1958 | Harmon | 331/65 |
| 3,271,672 | 9/1966 | Henderson | 235/92 PC |
| 3,290,589 | 12/1966 | Hubbard | 324/62 R |
| 3,315,156 | 4/1967 | Keller | 324/62 R |
| 3,544,891 | 12/1970 | Gerhard | 324/62 R |
| 3,657,725 | 4/1972 | Estelle et al. | 235/92 PC |

FOREIGN PATENT DOCUMENTS 1362731 8/1974 United Kingdom ................ 376/245

OTHER PUBLICATIONS

Power Supply Handbook, Kepco Inc., Flushing, N.Y., (3/66), Birman, pp. 44–47.
Source Book of Electronic Circuits, McGraw Hill, Markus, (1968), p. 494.

*Primary Examiner*—Sal Cangialosi
*Attorney, Agent, or Firm*—Karl F. Ross; Herbert Dubno

[57] ABSTRACT

An apparatus for detecting or otherwise monitoring, e.g. counting, each passage of a succession of conductive objects (especially graphite-sheathed ball-shaped nuclear fuel or breeder elements for the core of a nuclear reactor) through a pipe or tube having a conductive wall juxtaposed with the tip of an electrode. A high-voltage direct-current (d-c) generator is connected across the wall and the electrode in series with a high-ohmic resistor. A voltage divider is also connected across this gap and has a low-voltage portion across which a voltage drop of the order of up to 100 volts is detected as the signal which is applied to the monitoring circuit. Thus the electronic detector and counter circuit are connected across the low-voltage resistor of the voltage divider and this resistor is connected to the side of the electrode-pipe system opposite that to which the high-ohmic resistor is connected.

10 Claims, 3 Drawing Figures

APPARATUS FOR THE MONITORING OF THE PASSSAGE OF CONDUCTIVE OBJECTS THROUGH A TUBE

This is a continuation of application Ser. No. 894,032, filed Apr. 6, 1978, now abandoned.

FIELD OF THE INVENTION

The present invention relates to an apparatus for monitoring the passage of conductive objects through a duct and, more particularly, to a device for counting the number of graphite-sheathed spheroidal nuclear fuel or breeder particles displaced along a pipe.

BACKGROUND OF THE INVENTION

In the handling of nuclear fuels and breeder elements, it is frequently desirable to monitor the passage of so-called coated-particle nuclear fuel or breeder elements.

In nuclear-reactor techniques, the use of coated-particles, fuels and breeder materials has become increasingly important with the years, such particles consisting generally of a uranium or thorium-containing core sheathed in at least one layer of graphite. Such particles can be used directly in the nuclear reactor or can be encapsulated in graphite housing or bodies, or may even be contained in metal casing or the like.

In the production of such particles, which are generally spheroidal or ball-shaped, it is frequently necessary or desirable to count the number of particles displaced along a tube. This can also be the case in reactors in which such particles are circulated or an installation in which the particles are reprocessed or produced.

It is known to provide a system for monitoring the passage of conductive objects, such as the graphite-coated spheroidal elements described above, wherein the apparatus comprises a tube through which the objects pass and in which an electrically conductive part of the tube wall is juxtaposed with the tip of an electrode so that an electric field is established between this electrode and the opposite wall portion of the tube.

As each conductive article enters this field, it induces a spark discharge or electric breakdown of the gap between the electrode and the conductive wall portions of the tube which can be detected and used as the input to a counter or like monitoring circuit.

A system of this type is described in German Pat. No. DT-PS 2,018,624 in which a high voltage, high-frequency (a-c) source is connected across this gap and in the ground line a series resistor is provided. The counter is connected in parallel to this resistor, i.e. across the series resistor.

Upon breakdown of the gap, the current flow through the resistor increases temporarily and the resulting voltage drop is applied to the counter as the input signal representing the passage of the conductive article through the electric field and inducing the breakdown or discharge of the gap.

Tests have shown that the signals which are detected across this series resistor tend to vary significantly from breakdown to breakdown and hence from the passage of one object to the passage of another object because of the differences in the breakdown characteristics at each discharge. Furthermore, the entire system is sensitive to perturbations such that an unreliable count is frequently obtained.

OBJECTS OF THE INVENTION

It is, therefore, an important object of the present invention to provide an improved system for monitoring the passage of conductive bodies or objects through a tube in which the disadvantages of the earlier systems are obviated and whereby the reliability or precision of the system can be increased.

It is another object of this invention to provide an improved system for the purpose described which has been found to be particularly effective in the counting of graphite-coated spheroidal nuclear particles or bodies and provides an output which can be reliably used for data-processing purposes without further modification of the output.

It is an essential object of the invention to provide a system of the character described which provides only a single output for each passing object and accordingly signals the passage of each object in an apparatus for the counting of nuclear particles of the type generally described above.

SUMMARY OF THE INVENTION

These objects and others which will become apparent hereinafter are obtained, in accordance with the present invention, in a system which utilizes a tube through which the conductive particles are passed and which is formed with at least a conductive wall portion insulated from a juxtaposed electrode, the wall portion and the electrode constituting two spaced-apart members defining a discharge gap between them.

According to the principles of the present invention, instead of a high-frequency high-voltage generator as has been used in the prior art, a high-voltage direct current (d.c.) generator is connected across this gap in series with a high-ohmic resistor which is tied between one of the members and a respective terminal of this d.c. source.

We also connect across the gap a voltage divider consisting of at least two sections including a low-voltage section dimensions to develop maximum voltage of the order of 100 volts and across which a signal is tapped to a detector as will be described in greater detail below.

It has been found to be important to connect the low-voltage portion of this voltage divider to the other member defining the gap, i.e. the member opposite that to which the high-ohmic resistor is connected.

According to an important feature of the invention, the circuit connected to the low-voltage section of the low-voltage divider is effective to carry out an amplitude demodulation of the high-frequency voltage pulse so as to generate an output voltage signal, which can be counted, corresponding substantially to the envelope curve of the voltage signal developed across the low-voltage resistor of the voltage divider.

In other words, as each object passes through the gap, the interaction of the high-ohmic resistor, the gap and the leakage (stray) capacity parallel to the gap produces a high-voltage signal which appears across the low-voltage section of the voltage divider and it is this signal which is subjected, in the aforementioned circuit, to amplitude demodulation so that the output of the circuit is a voltage signal corresponding substantially to the envelope curve of the signal at this low-voltage section of the voltage device.

In contradistinction to the prior-art system described above, in which the high-voltage generator is a high-frequency generator as well, the system of the present invention uses a direct-current generator.

The invention is based upon our discovery that, when a high-ohmic resistor is provided in one of the connecting lines between the high-voltage d-c generator and the measuring unit consisting of the electrode and the conductive portion of the tube wall defining the gap, this resistor together with the gap and the stray capacitance in parallel with the gap constitutes an oscillation-generating network of the sawtooth-generator type as one of the objects traverses the gap and thus creates the conditions necessary for spark discharge in the latter.

The spark discharge effectively discharges the stray capacitance and the latter effectively recharges upon interruption of the spark and hence moves out of the zone between the conductive objects.

Until the next conductive object arrives at the zone, the conditions for spark discharge are removed and thus another breakdown can occur. The process is repeated for each object until the object leaves the gap or, more generally, the electric field between the electrode and the conductive wall portion.

The frequency of this oscillation, by analogy with that of a relaxation oscillator, is a function of the gap width and stray capacity and is also a function of the resistance value. In practical terms using a high-ohmic resistor of a value of 20 megohms, the frequency will be between 1 and 1.5 kHz.

In other words, in spite of the fact that a direct-current generator is used, the oscillation-generating process upon the passage of a conductive article through the tube, gives rise to a high-frequency oscillation signal which is detected at the low-ohmic resistor of the voltage divider and is subjected in the circuit connected thereacross to amplitude demodulation. The resulting envelope-curve signal is characteristic for the passage of a single object and remains unchanged even if considerable noise is generated in the system or other electrical perturbation are created or detected.

As a result, the system is highly reliable and is particularly desirable where an accurate monitoring of the individual conductive object is desired.

The reliability of the output signal of the circuit, which output signal may be used for the recording and or registering and/or counting of the objects, is most pronounced when the circuit for amplitude demodulation also includes a threshold amplifier, and a limiting or clipper amplifier. The circuit can also include a buffer amplifier, serving as an impedance converter, between the amplitude deomdulator and the input to the circuit.

By appropriate adjustment of the threshold value of the threshold amplifier, oscillations of an amplitude below the threshold value can be eliminated from the high-frequency oscillating signals. The clipper amplifier, naturally, eliminates those signals which have an amplitude higher than a predetermined limiting value. As a result even signals which deviate sharply from a rectangular wave are converted or passed as rectangular wave forms. This is especially desirable when the distances between an electrode and the object traversing the gap, because of the geometry of the object varies and different breakdown conditions are established between passages of the successive An increase in the voltage oscillation frequency during the passage of an object and hence better conditions for the handling of the signals can be obtained by connecting the high-ohmic resistor with the smallest (shortest) possible lead to the electrode of the electrically conducted portion of the tube wall. This ensures the stray capacitance of the measuring stretch will be relative small.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
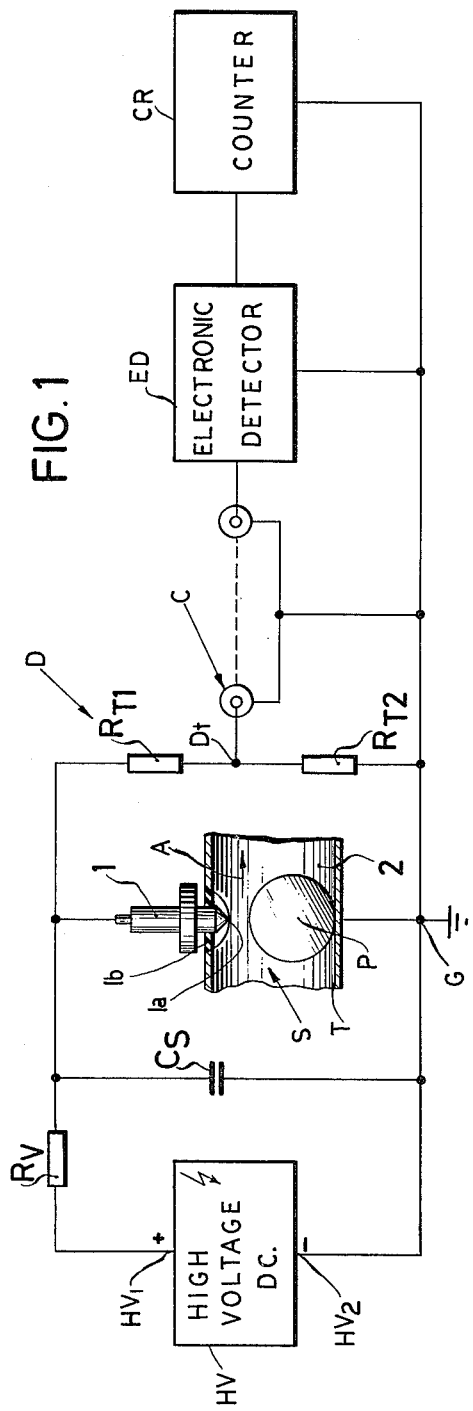
FIG. 1 is a diagrammatic axial cross section through a portion of a counting system according to the invention, with parts of the electric circuits illustrated in block-diagram form.

FIG. 1 shows a system for the counting of graphite-coated nuclear-fuel for breeder particles P which traverse a measuring tube T in the direction of arrow A so as to pass between an electrode 1 a pointed tip $1a$ juxtaposed with a conductive wall portion 2 of the tube T which is grounded. The tube T is provided with an insulated portion $1b$ in which the electrode 1 is lodged so that the electrode 1 is electrically insulated from the juxtaposed wall portion 2.

As is also apparent from FIG. 1, the positive pole $HV_1$ of a high-voltage direct current generator is connected in series with a high-ohmic resistor $R_\nu$ of a value of 20 Mohm with the electrodes 1 while the negative terminal $HV_2$ of the high-voltage current generator HV is connected to ground G and hence to the electrically conductive portion 2 of the tube T.

The measuring stretch is thus a gap S having a stray capacitance represented by the capacitor $C_S$ in FIG. 1.

A voltage divider D is connected across members 1 and 2 and hence across the gap S. The voltage divider consists of a high-ohmic resistor $R_{T1}$ of a value of about 140 Mohms and, in series therewith, a low-ohmic resistor $R_{T2}$ having a value of about 50 Kohms. A shielded cable C connects the divider type $D_t$ to the input of the electronic detectors circuit ED which serves to effect amplitude demodulation in the manner previously described. The shield of the cable and the other side of the resistor $R_{T2}$ is thus connected to the lead $HV_2$ opposite that which is provided with the high-ohmic resistor $R_V$.

Figure 2:
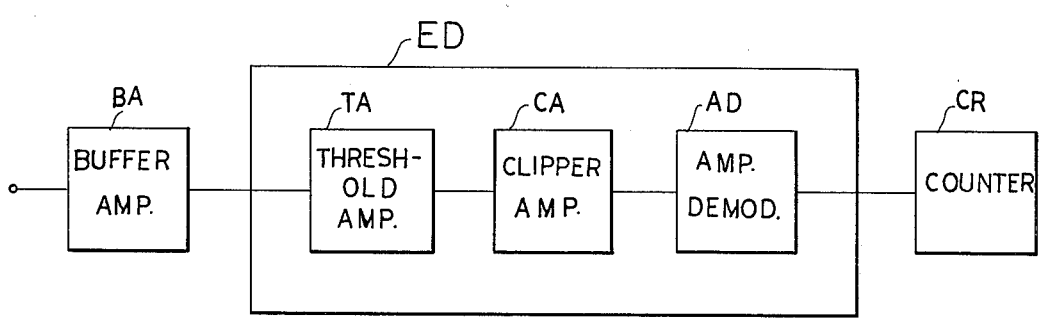
FIG. 2 is a block diagram of the main components of the signal-process circuit of the present invention.

As can be seen from FIG. 2, the detector ED can include a threshold amplifier TA, clipper amplifier CA and the amplitude demodulator AD as previously described. The threshold amplifier TA passes only the portion of the signal above a predetermined amplitude, the clipper amplifier CA eliminates the portion of the signal above a higher amplitude and the amplitude demodulator AD provides an output pulse representing the envelope curve of the input signal to the electronic detector ED. A buffer amplifier BA is provided between the terminal $D_t$ and the electronic detector ED and the counter DR is connected, of course, to the output of the electronic detector ED. To permit effective amplitude demodulation, the circuit can include pulse formers and any necessary clocks (not shown) so that the output signal of the electronic detector ED will be appropriate to the pulse counter CR.

Figure 3:
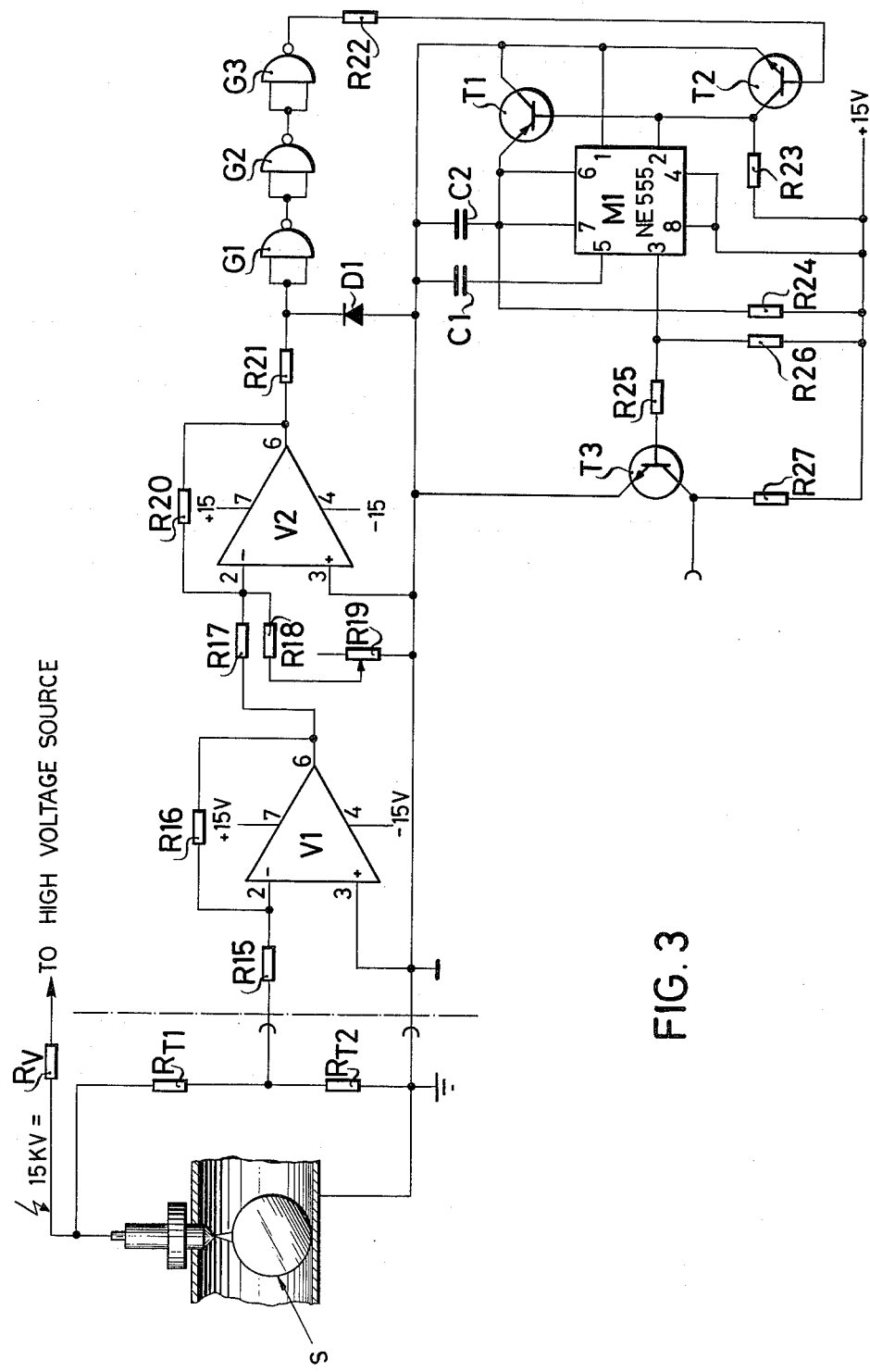
FIG. 3 is a circuit diagram of this system.

As will be apparent from FIG. 3, the high-voltage direct current source applies about 15 KV through the high-ohmic resistor RV to the gap S which has been fully described previously, the output being detected by a buffer amplifier whose input resistor R15 is applied to the inverter input of the operational amplifier V1 forming this buffer amplifier. The other input 3 of this amplifier is connected to the opposite side of the resistor R and hence to ground as noted. The amplification ratio of this amplifier is 1:1 as controlled by the feedback resistor R16, the output signal being applied through an input resistor R17 to the inverter input of the threshold amplifier V2 which functions as an adder. A variable resistor R19 connected in series with a resistor R18 adjusts the threshold value. The feedback resistor is here represented at R20.

The output of the threshold amplifier is applied via resistor R21 to the clipper amplifier here shown to be constituted by three series connected NAND gates G1, G2 and G3, a rectifier diode D1 being connected between the input and ground. The signal is applied to the demodulator via resistor R22 and the demodulator consists of back-triggerable monostable multivibrator M1, the transistors T1 and T2, the resistors R23, R24, R26 and the condensers C1 and C2. The output signal is taken into a cathode follower transistor T3. The demodulator circuit is of course conventional in the art and provides an input representing the envelope of the high-frequency signal inputted to the circuit.

The system, of course, operates in the manner previously described and provides a train of pulses of substantially rectangular waveforms for successive pieces of conductive objects between the electrode 1 and the wall 2, which signals are registered in the counter CR.

We claim:

1. A system for monitoring the passage of individual conductive objects for the core of a nuclear reactor along a path, said system comprising:
    a measuring stretch including an electrode disposed along said path and juxtaposed with a conductive tube wall so that said electrode and said conductive tube wall constitute members defining a normally nonconductive gas-filled gap subject to electrical breakdown and traversed by said object;
    a high-voltage direct-current generator capable of generating voltages of the order of 15 kilovolts connected across said members and said gap whereby a voltage field is established across said gap sufficient to develop a separate discharge in the presence of said object;
    a high-ohmic resistor with a resistance value of megaohms connected in series with said electrode and said high-voltage direct-current generator;
    a voltage divider connected across said members and including a low-ohmic resistor connected to said wall and adapted to develop a varying high-frequency oscillation signal of a signal voltage of the order of up to 100 volts upon the passage of an object through said gap; and
    circuit means responsive to said signal voltage and including an amplitude demodulator connected across said low-ohmic resistor and generating a signal corresponding substantially to the envelope curve of a high-frequency oscillation signal induced by the passage of each object through said gap as a result of the interaction of said object, said field, a stray capacitance of said stretch, said high-ohmic resistor and said gap.

2. A system for monitoring the passage of individual conductive objects for the core of a nuclear reactor along a path, said system comprising:
    a measuring stretch including an electrode disposed along said path and juxtaposed with a conductive tube wall so that said electrode and said conductive tube wall constitute members defining a normally nonconductive gas-filled gap subject to electrical breakdown and traversed by said object;
    a high-voltage direct-current generator connected across said members and said gap whereby a voltage field is established across said gap sufficient to develop a separate discharge in the presence of said object;
    a high-ohmic resistor connected in series with said electrode and said high-voltage direct-current generator;
    a voltage divider connected across said members and including a low-ohmic resistor connected to said wall and adapted to develop a varying high-frequency oscillation signal of a signal voltage of the order of up to 100 volts upon the passage of an object through said gap; and
    circuit means responsive to said signal voltage and including an amplitude demodulator connected across said low-ohmic resistor and generating a signal corresponding substantially to the envelope curve of a high-frequency oscillation signal induced by the passage of each object through said gap as a result of the interaction of said object, said field, a stray capacitance of said stretch, said high-ohmic resistor and said gap.

3. The system defined in claim 2 wherein said circuit means includes a threshold amplifier and a clipper ahead of said modulator.

4. The system defined in claim 2 wherein said circuit means includes a buffer amplifier ahead of said demodulator.

5. The system defined in claim 2 wherein said high-ohmic resistor is connected by the smallest possible lead with said electrode to minimize said stray capacity.

6. The system defined in claim 2 wherein said electrode is received in an electrically insulating portion of a duct and juxtaposed with said wall, said wall constituting the wall of said duct, said objects being graphite-coated nuclear particles.

7. The system defined in claim 6 wherein said circuit means includes a buffer amplifier connected across said low-ohmic resistor and formed as an inverting operational amplifier.

8. The system defined in claim 7 further comprising a threshold amplifier connected to said buffer amplifier.

9. The system defined in claim 8 wherein said circuit means includes a clipper connected to said threshold amplifier.

10. The system defined in claim 9, further comprising a counter connected to said circuit means.

* * * * *